United States Patent [19]
Weaver

[11] Patent Number: 5,524,155
[45] Date of Patent: Jun. 4, 1996

[54] DEMULTIPLEXER FOR WAVELENGTH-MULTIPLEXED OPTICAL SIGNAL

[75] Inventor: Douglas J. Weaver, Dallas, Tex.

[73] Assignee: Texas Instruments Incorporated, Dallas, Tex.

[21] Appl. No.: 369,239

[22] Filed: Jan. 6, 1995

[51] Int. Cl.$^6$ .................................................. G02B 6/26
[52] U.S. Cl. .................. 385/24; 385/16; 359/115
[58] Field of Search ...................... 385/15, 16, 18, 385/24, 37; 359/115, 138, 122, 109, 113, 115, 117, 124, 128

[56] References Cited

U.S. PATENT DOCUMENTS

| | | | |
|---|---|---|---|
| 3,699,344 | 10/1972 | Rutz | 455/609 X |
| 4,431,258 | 2/1984 | Fye | 385/24 X |
| 4,472,797 | 9/1984 | Nicia | 385/24 X |
| 4,483,582 | 11/1984 | Sheem | 385/24 |
| 4,824,200 | 4/1989 | Isono et al. | 385/24 |
| 4,856,862 | 8/1989 | Passmore et al. | 385/37 X |
| 4,886,334 | 12/1989 | Aoki | 385/24 X |
| 5,199,088 | 3/1993 | Magel | 385/18 |
| 5,345,521 | 9/1994 | McDonald et al. | 385/19 |
| 5,414,548 | 5/1995 | Tachikawa et al. | 385/37 X |

*Primary Examiner*—Akm E. Ullah
*Attorney, Agent, or Firm*—Julie L. Reed; James C. Kesterson; Richard L. Donaldson

[57] ABSTRACT

A demultiplexer (10) for a wavelength-multiplexed optical signal. A series of optical filters (13) along an input line (12) each select a signal component of a given wavelength. An optical shutter (14) receives the output of each filter (13), and is operated so as to either block or pass the filtered signal component. The filters (13) and shutters (14) may be made using integrated circuit fabrication techniques, and the entire demultiplexer (10) may be made as a monolithic device.

20 Claims, 1 Drawing Sheet

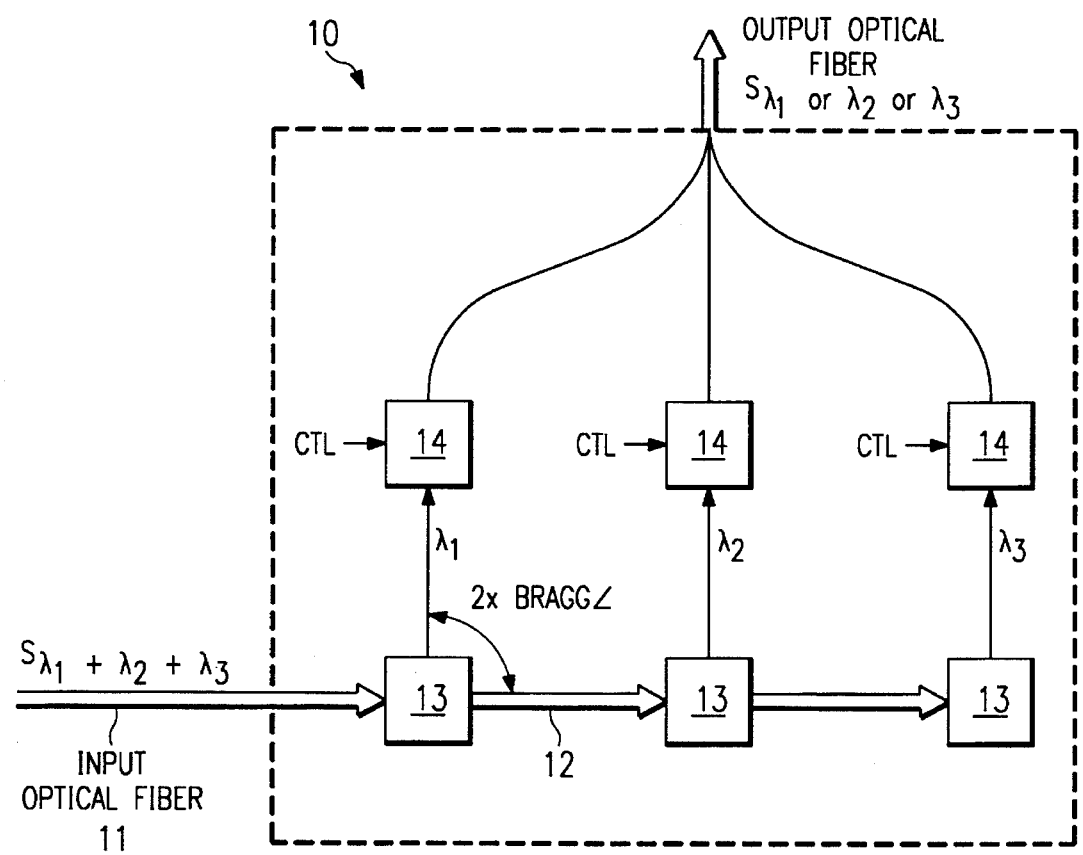

DEMULTIPLEXER FOR WAVELENGTH-MULTIPLEXED OPTICAL SIGNAL

TECHNICAL FIELD OF THE INVENTION

This invention relates to optical data communications, and more particularly to a demultiplexer for selecting a signal having a given wavelength from a wavelength-multiplexed optical signal.

BACKGROUND OF THE INVENTION

A trend in data communications is to increase the use of optical fiber as a media. In an optical fiber communications system, voice, video, or data are converted to a coded pulse stream of light. This pulse. stream is carried by optical fibers to a receiving or regenerating station. At the final receiving station, the light pulses are converted into the form of the original information.

A big advantage of an optical communication system is its tremendous information carrying capability. By multiplexing different channels, a single optical fiber can carry thousands of channels at the same time.

The primary parameters used for multiplexing optical channels are wavelengths, time, frequency, phase, and space. Wavelength division multiplexing (WDM) involves the use of different wavelengths, and is currently in wide use.

SUMMARY OF THE INVENTION

One aspect of the invention is an optical demultiplexer for selecting a component of a wavelength-multiplexed optical signal. An input line receives the wavelength- multiplexed signal, and delivers it to a series of optical filters. Each optical filter selects a component of the wavelength-multiplexed signal and passes the component to an optical shutter. Each optical shutter either blocks or passes the component in accordance with an on or an off state of the shutter, as determined by a signal on a shutter control. An output line is in optical communication with each optical shutter, and transmits a signal component from one of said optical shutters when that optical shutter is in an on position.

An advantage of the invention is that it is an all-optical device. This eliminates signal-to-noise problems that arise with other types of demultiplexers that require the signal to be converted to an electrical signal, which must be reconverted if there is to be further optical transmission. Also, the demultiplexer is compact and low cost. A further advantage is that the demultiplexer could be manufactured using integrated circuit technology and could be made as a single chip.

BRIEF DESCRIPTION OF THE DRAWINGS

FIG. 1 illustrates an optical demultiplexer in accordance with the invention.

DETAILED DESCRIPTION OF THE INVENTION

FIG. 1 illustrates an optical demultiplexer 10 in accordance with the invention. As explained below, demultiplexer 10 is an all-optical device that selects one signal component of a multiplexed input signal for further transmission.

An input optical fiber 11 delivers a wavelength-multiplexed optical signal to demultiplexer 10. For purposes of example, it is assumed that there are three signal components, of wavelengths $\lambda 1$, $\lambda 2$, and $\lambda 3$. Input fiber 11 may be a single mode fiber.

A waveguide 12 carries the input signal through a series of filters 13, which each select a signal component having one of the three wavelengths. Various types of filters could be used, provided that they are sufficiently selective for the bandwidth of the signal components.

An example of a suitable filter 13 is a reflective micrograting filter. Filters of this type are known in the art of microoptics, and described in various publications. An article describing microgratings is Suhara, et al, "Integrated Optics Components and Devices Using Periodic Structures", *IEEE Journal of Quantum Electronics,* Vol. QE-22, No. 6, June 1986. Such filters 13 are designed with the proper angle and grating period for the desired wavelength and laid across waveguide 12 to reflect a specific wavelength. In FIG. 1, each filter 13 has its output line at angle that is twice the Bragg angle, as is known in the art of optical microfilters.

Other types of optical filters 13 could be used. For example, microinterference gratings or color separation filters could be sufficiently selective.

Each filter 13 is in optical communication with an optical shutter 14. From each filter 13, the selected optical signal component is directed to the associated shutter 14, which is either "on" or "off". In practice, only one, or none, of shutters 14 is on.

An example of a suitable optical shutter 14 is a digital micromirror device (DMD), such as is manufactured by Texas Instruments Incorporated. A DMD is a micromechanical device having at least one tilting mirror. The mirror is suspended by torsion hinges over an air gap and underlying address circuitry. Two address electrodes are at opposing sides of the mirror. Depending on an applied address voltage, the address electrodes can be made to electrostatically attract the mirror causing it to tilt in one direction or the other.

For use with the invention, each shutter 14 could be a single DMD having a single mirror element or an array of mirror elements. However, it is also possible to use a DMD array of mirror elements for all of shutters 14, with one mirror element, or a block of mirror elements, serving to shutter each wavelength.

The structure and operation of DMDs, for applications other than as optical shutters, is described in various patents. These include U.S. Pat. No. 4,662,746, entitled "Spatial Light Modulator and Method"; U.S. Pat. No. 4,954,789, entitled "Spatial Light Modulator"; U.S. Pat. No. 4,956,610, entitled "Spatial Light Modulator"; U.S. Pat. No. 5,061,049, entitled. "Spatial Light Modulator and Method"; U.S. Pat. No. 5,083,857, entitled Multi-level Deformable Mirror Device"; and U.S. patent Ser. No. 08/171,303, entitled "Improved Multi-level Digital Micromirror Device." Each of these patents is assigned to Texas Instruments Incorporated, and each is incorporated herein by reference.

The shutters 14 are operated so as to either block or pass light from the associated filter 13 to an output fiber 15. A control line carries a control signal, CTL, that sets each shutter 14 on or off. In the case of a DMD, the mirror elements are selectively tilted, such that the "on" shutter directs light to the output fiber 15 and the "off" shutters block the light. The mirror elements may be reflective such that they direct light along a desired path, or they may be non-reflective and used to simply block light. For purposes of this description, the "mirror" elements of DMD-type shutter are referred to as such regardless of whether or not they are reflective.

Other types of optical Shutters 14 could be used, and provide varying shutter speeds. For example, liquid crystal shutters or lithium niobate shutters are suitable.

A feature of the invention is that demultiplexer 10 may be fabricated using integrated circuit techniques, such as photolithography and various other material deposition and feature-formation techniques. In fact, for certain types of filters 13 and shutters 14, the demultiplexer 10 could be a monolithic (single-chip) device. For example, micrograting filters 13 and DMD shutters 14, such as described above, could be fabricated on the same die.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An optical demultiplexer for selecting a component of a wavelength-multiplexed optical signal, comprising:

an input line for receiving said wavelength-multiplexed signal a series of optical filters along said input line, each optical filter for selecting a component of said wavelength-multiplexed signal;

an optical shutter in optical communication with each of said optical filters, for blocking or passing said component in accordance with an on or an off state of said shutter;

a shutter control line for determining whether each of said shutters is on or off; and an output line in optical communication with each of said optical shutters, for transmitting a signal component from one of said optical shutters when that optical shutter is in an on position, such that only of said optical shutters is in said on position at any one time.

2. The demultiplexer of claim 1, wherein said optical filters are reflective gratings.

3. The demultiplexer of claim 1, wherein said optical filters are interference gratings.

4. The demultiplexer of claim 1, wherein said optical filters are color separation filters.

5. The demultiplexer of claim 1, wherein each said optical shutter is comprised of one or more reflective mirror elements of a digital micromirror device, operated so as to accomplish said blocking by reflecting said component to said output line.

6. The demultiplexer of claim 1, wherein each said optical shutter is comprised of one or more reflective mirror elements of a digital micromirror device, operated so as to accomplish said blocking by reflecting said component from said output line.

7. The demultiplexer of claim 1, wherein each said optical shutter is comprised of one or more non-reflective mirror elements of a digital micromirror device, operated so as to accomplish said blocking by obstructing said component from said output line.

8. The demultiplexer of claim 1, wherein said optical shutter is comprised of one or more liquid crystal elements.

9. The demultiplexer of claim 1, wherein each said optical shutter is comprised of one or more lithium niobate shutters.

10. The demultiplexer of claim 1, wherein said demultiplexer is manufactured using integrated circuit fabrication techniques.

11. The demultiplexer of claim 1, wherein said demultiplexer is manufactured as a monolithic device.

12. A method of demultiplexing a wavelength-multiplexed optical signal, comprising the steps of:

receiving said wavelength-multiplexed signal using a series of optical filters to select components of said wavelength-multiplexed signal; and using an optical shutter in optical communication with each of said optical filters, for blocking or passing said component in accordance with an on or an off state of said shutter, such that only one of said optical shutters is on at any one time.

13. The demultiplexer of claim 12, wherein said optical filters are reflective gratings.

14. The demultiplexer of claim 12, wherein said optical filters are interference gratings.

15. The demultiplexer of claim 12, wherein said optical filters are color separation filters.

16. The demultiplexer of claim 12, wherein each said optical shutter is comprised of one or more reflective mirror elements of a digital micromirror device, operated so as to accomplish said blocking by reflecting said component to said output line.

17. The demultiplexer of claim 12, wherein each said optical shutter is comprised of one or more reflective mirror elements of a digital micromirror device, operated so as to accomplish said blocking by reflecting said component from said output line.

18. The demultiplexer of claim 12, wherein each said optical shutter is comprised of one or more non-reflective mirror elements of a digital micromirror device, operated so as to accomplish said blocking by obstructing said component from said output line.

19. The demultiplexer of claim 12, wherein said optical shutter is comprised of one or more liquid crystal elements.

20. The demultiplexer of claim 12, wherein each said optical shutter is comprised of one or more lithium niobate shutters.

* * * * *